United States Patent
Maeshima

(10) Patent No.: US 8,887,007 B2
(45) Date of Patent: Nov. 11, 2014

(54) MEDIA PROCESSING SYSTEM, CONTROL METHOD FOR MEDIA PROCESSING SYSTEM, AND MEDIA PROCESSING DEVICE

(75) Inventor: Hidetoshi Maeshima, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 335 days.

(21) Appl. No.: 13/428,227

(22) Filed: Mar. 23, 2012

(65) Prior Publication Data

US 2012/0243050 A1 Sep. 27, 2012

(30) Foreign Application Priority Data

Mar. 23, 2011 (JP) ................................ 2011-063633

(51) Int. Cl.

| | |
|---|---|
| G06F 11/00 | (2006.01) |
| G11B 20/18 | (2006.01) |
| G11B 27/034 | (2006.01) |
| G11B 27/34 | (2006.01) |
| B41J 3/407 | (2006.01) |
| G11B 7/24094 | (2013.01) |
| G11B 27/19 | (2006.01) |
| G11B 23/40 | (2006.01) |
| G11B 27/36 | (2006.01) |

(52) U.S. Cl.
CPC .......... *G11B 20/1816* (2013.01); *G11B 27/034* (2013.01); *G11B 27/34* (2013.01); *B41J 3/4071* (2013.01); *G11B 7/24094* (2013.01); *G11B 2020/1853* (2013.01); *G11B 27/19* (2013.01); *G11B 23/40* (2013.01); *G11B 27/36* (2013.01); *G11B 2020/1869* (2013.01); *G11B 20/1879* (2013.01)
USPC ....... 714/47.2; 714/704; 358/1.18; 369/53.44

(58) Field of Classification Search
CPC .............. G06F 11/0754; G06F 11/076; G06F 11/1666; G06F 11/2094
USPC .............. 714/6.13, 6.32, 47.2, 704; 358/1.18; 369/53.35, 53.44
See application file for complete search history.

(56) References Cited

U.S. PATENT DOCUMENTS 5,475,667 A * 12/1995 Kamimura et al. ........ 369/53.14
6,400,659 B1 6/2002 Kitaoka
(Continued)

FOREIGN PATENT DOCUMENTS

EP 1 865 501 A1 12/2007
EP 2 500 905 A1 9/2012
(Continued)

OTHER PUBLICATIONS

Standard ECMA-379, 3rd Edition, Test Method for the Estimation of the Archival Lifetime of Optical Media. Geneva, Switzerland. Jun. 2010. http://www.ecma-international.org/publications/files/ECMA-ST/ECMA-379.pdf. Last Accessed Jul. 18, 2012.

(Continued)

*Primary Examiner* — Marc Duncan
(74) *Attorney, Agent, or Firm* — Nutter McClennen & Fish LLP; John J. Penny, Jr.; Michael P. Visconti, III

(57) ABSTRACT

A media processing system enables producing a copy of media based on the state of media deterioration. An error rate measurement unit measures the error rate of recorded media after specific data is written to the media; an error rate evaluation unit determines if the media error rate measured by the error rate measurement unit is less than or equal to a preset threshold value; and a data recording unit that, when the error rate evaluation unit determines the error rate exceeds the specific threshold value, writes specific data recorded to the recorded media to other unused media.

10 Claims, 9 Drawing Sheets

(56) References Cited

U.S. PATENT DOCUMENTS

| | | | |
|---|---|---|---|
| 7,835,242 B2 | 11/2010 | Nakayama | |
| 7,885,148 B2 | 2/2011 | Ikeda | |
| 8,184,516 B2* | 5/2012 | Kimmelmann et al. | 369/53.44 |
| 8,375,246 B2* | 2/2013 | Ito | 714/6.13 |
| 8,693,299 B2* | 4/2014 | Maeshima | 369/53.44 |
| 2002/0130188 A1 | 9/2002 | Scholtysik | |
| 2005/0191105 A1 | 9/2005 | Narusawa | |
| 2005/0232103 A1* | 10/2005 | Yoshida | 369/47.14 |
| 2006/0095647 A1 | 5/2006 | Battaglia et al. | |
| 2006/0290985 A1* | 12/2006 | Kim | 358/1.18 |
| 2007/0115783 A1* | 5/2007 | Nakayama | 369/53.33 |
| 2008/0044925 A1 | 2/2008 | Isojima et al. | |
| 2009/0034384 A1* | 2/2009 | Geelen | 369/53.35 |
| 2009/0046552 A1* | 2/2009 | Tsukada | 369/53.17 |
| 2010/0080097 A1* | 4/2010 | Nakamae | 369/47.15 |
| 2010/0332894 A1* | 12/2010 | Bowers et al. | 714/8 |
| 2012/0236700 A1 | 9/2012 | Maeshima | |

FOREIGN PATENT DOCUMENTS

| | | |
|---|---|---|
| JP | 04-372768 A | 12/1992 |
| JP | 06-162593 A | 6/1994 |
| JP | 2006202379 A | 8/2006 |
| JP | 2007-014916 A | 1/2007 |
| JP | 2007/149161 A | 6/2007 |
| WO | 89/06428 A1 | 7/1989 |
| WO | 2007/000707 A2 | 1/2007 |

OTHER PUBLICATIONS

Davies, Cdr Recording Failure—Find Out the Real Reasons. Articlesbase Free Online Articles Directory. Nov. 11, 2010. http://www/articlesbase.com/hardware-articles/cdr-recprdomg-failure-find-out-the-real-reasons-3648110.htm. Last Accessed Jul. 19, 2012.

* cited by examiner

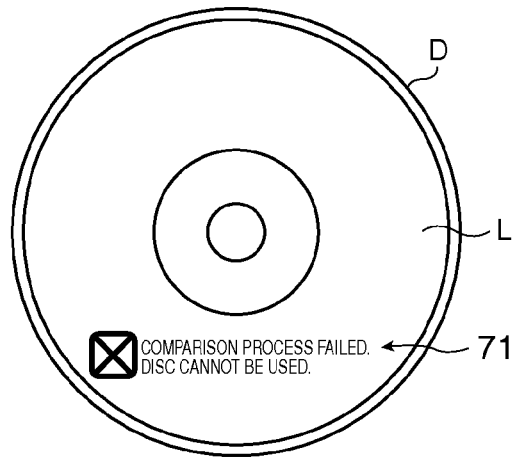
FIG. 3A   WHEN COMPARISON PROCESS FAILS
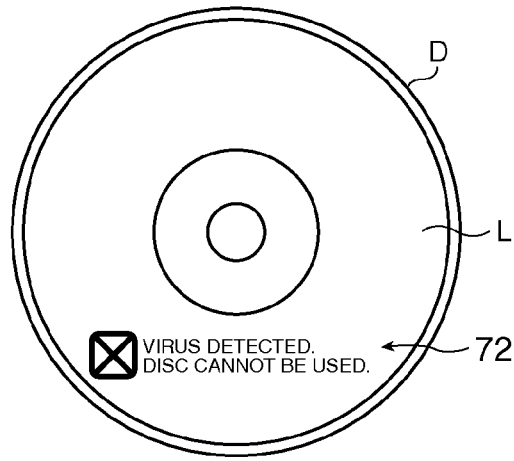
FIG. 3B   WHEN VIRUS DETECTED
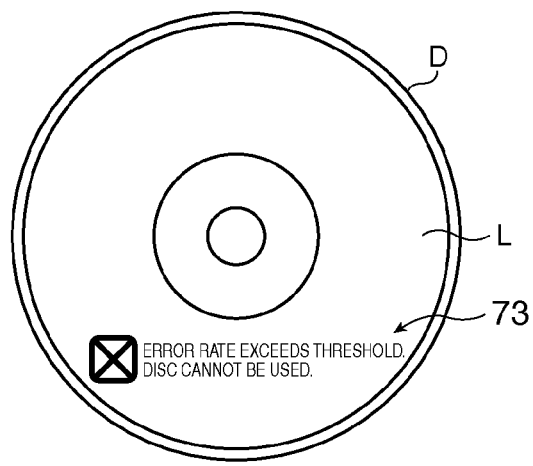
FIG. 3C   IF ERROR RATE EXCEEDS THRESHOLD

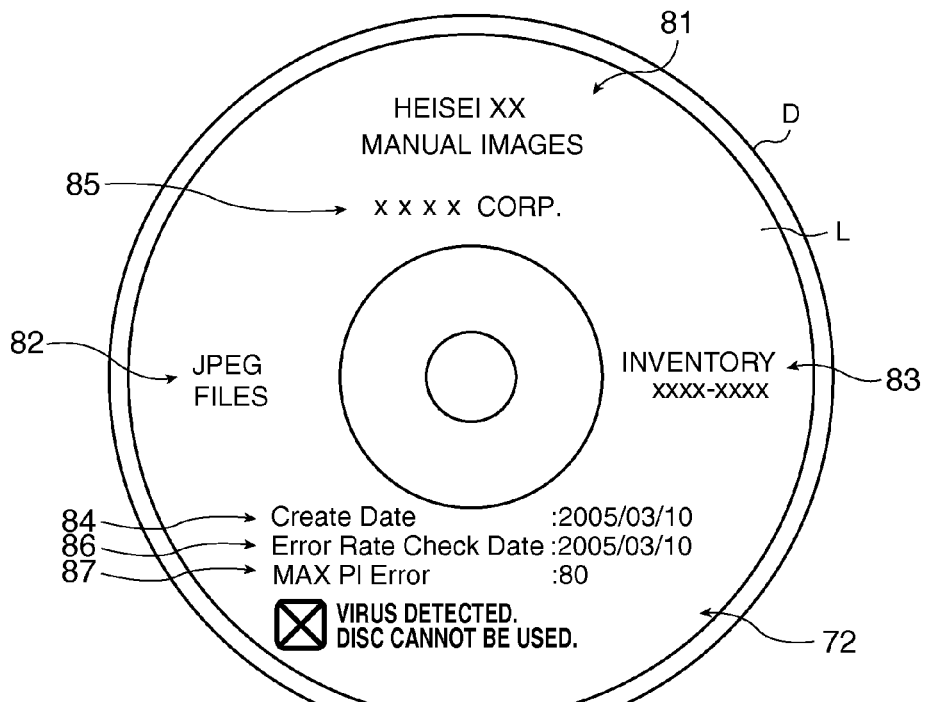
FIG. 6A    WHEN VIRUS DETECTED
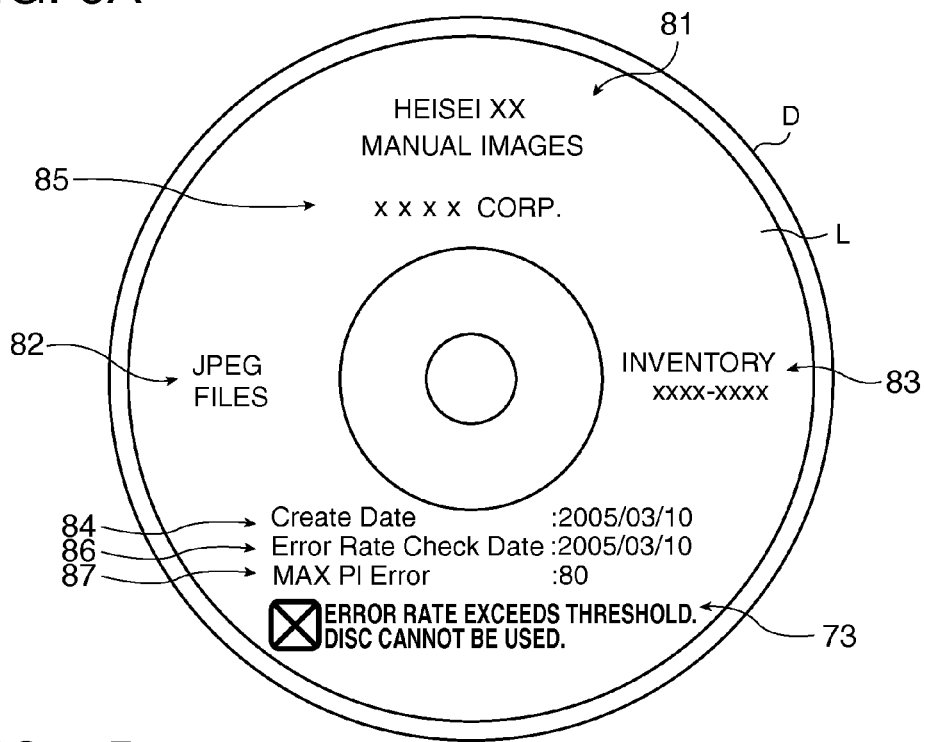
FIG. 6B    IF ERROR RATE EXCEEDS THRESHOLD

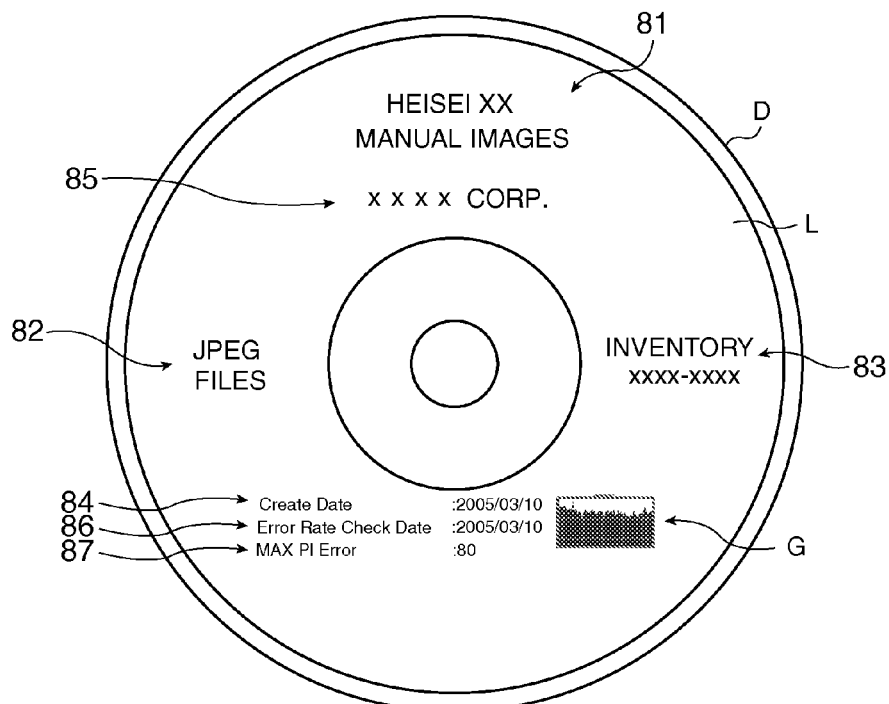
FIG. 8A  LABEL PRINTED DURING DISC PRODUCTION
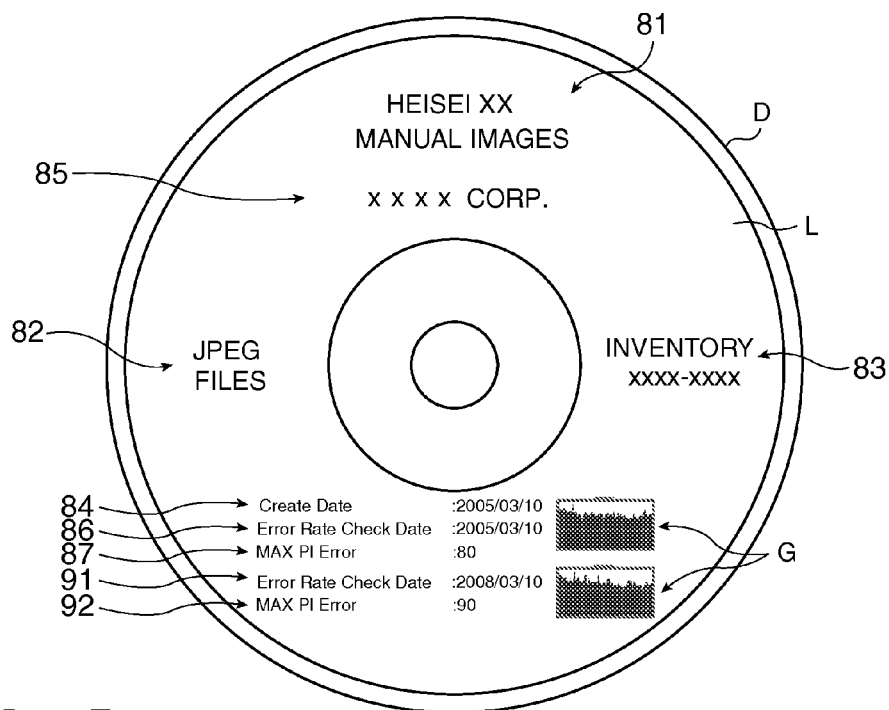
FIG. 8B  LABEL PRINTED DURING DISC INSPECTION

MEDIA PROCESSING SYSTEM, CONTROL METHOD FOR MEDIA PROCESSING SYSTEM, AND MEDIA PROCESSING DEVICE Priority is claimed under 35 U.S.C. §119 to Japanese Application No. 2011-063633 filed on Mar. 23, 2011, which is hereby incorporated by reference in its entirety.

BACKGROUND

1. Technical Field

The present invention relates to a media processing system capable of writing data to media and printing on the label side of the media, to a control method for the media processing system, and to a media processing device.

2. Related Art

Media processing devices that write data and print labels on media such as CDs and DVDs (optical discs) are known. Such media processing devices supply (transport) one blank disc from a supply stacker storing multiple blank discs to a media drive whereby data is written to the disc, then supply the disc to which data was written to an internal printer that prints on the label side, and then discharge the disc thus produced (published) to a recovery stacker. See, for example, Japanese Unexamined Patent Appl. Pub. JP-A-2006-202379.

Paper documents are increasingly digitized and recorded to CDs, DVDs, and other types of media (optical discs) for long-term storage of the digitized electronic documents. The CDs, DVDs, and other media used as the recording medium have a life expectancy of a specific time (approximately several decades) and are suited to long-term data storage. In reality, however, media deterioration is accelerated by factors such as media quality and the storage environment, and media life varies. As a result, stored media (discs to which data has been written) may expire over time, resulting in the data recorded thereto being unreadable and the data being lost. However, the media processing device described above cannot determine the condition of the media (the degree of deterioration), and therefore cannot solve

SUMMARY

A media processing system, control method for a media processing system, and a media processing device according to the present invention enable duplicating media based on the degree of media deterioration.

A media processing system according to an aspect of at least one embodiment of the invention has an error rate measurement unit that measures an error rate of recorded media after specific data is written; an error rate evaluation unit that determines if the media error rate measured by the error rate measurement unit is less than or equal to a preset threshold value; and a data write unit that, when the error rate evaluation unit determines the error rate exceeds the specific threshold value, writes the specific data recorded to the recorded media to other media.

Another aspect of at least one embodiment of the invention is a method of controlling a media processing system, including: an error rate measurement step that measures an error rate of recorded media to which specific data is written; an error rate evaluation step that determines if the error rate measured by the error rate measurement step is less than or equal to a preset threshold value; and a data write step that, when the error rate evaluation step determines that the error rate exceeds the specific threshold value, writes the specific data recorded to the recorded media to other media.

By measuring the error rate of recorded media, the invention can evaluate the quality (degree of deterioration) of the recorded media. In addition, if the error rate exceeds the threshold value, that is, if the recorded media has deteriorated, a duplicate of the recorded media can be created by writing the data from the recorded media to other media (a blank disc). As a result, when long-term data storage is necessary, data loss due to deterioration of the recorded media can be prevented, and new media with quality suitable for long-term data storage can be easily produced. More particularly, when regular inspection (verifying) of the condition of a large number of recorded media is required, the work required for the inspection process can be reduced, thereby saving labor.

A media processing system according to another aspect of at least one embodiment of the invention preferably also has a label print unit that prints on the label side of the media; and a label information acquisition unit that acquires label information, which is information printed on the label side of the recorded media. When the error rate evaluation unit that determines the error rate exceeds the specific threshold value, the label print unit prints the label information on the label side of the other media.

When producing a copy of the recorded media, this aspect of the invention enables printing the same information on the label side of the media copy (other media) as on the label side of the recorded media (the original media). As a result, a copy can be produced with the same data recorded on the recording surface and the same information printed on the label side as the original recorded media.

Further preferably in a media processing system according to another aspect of at least one embodiment of the invention, the label print unit prints the same information indicating the same on the label side of the recorded media when the error rate evaluation unit determines the error rate exceeds the specific threshold value.

This aspect of the invention enables the user to know why the recorded media is defective.

Further, preferably in a media processing system according to another aspect of at least one embodiment of the invention, the label print unit prints error rate information related to the measured error rate on the label side of the recorded media when the error rate evaluation unit determines the error rate is less than or equal to the specific threshold value.

Further preferably in a media processing system according to another aspect of at least one embodiment of the invention, at least one of the maximum error rate and a graph showing the error rate is included in the error rate information.

Because error rate information is printed on the label side in these aspects of the invention, the error rate of the recorded media can be easily known. Furthermore, because error rate information can be printed in many different ways, different printing formats can be conveniently used according to the management standards at that time. For example, if knowing only the maximum error rate is sufficient, only the maximum error rate is printed, but if more detailed error rate information is needed, the print content can be changed according to the circumstances to print an error rate graph in addition to the maximum error rate, for example.

Note that in addition to the above, the average error rate or total number of errors could be printed as the error rate information.

A media processing system according to another aspect of at least one embodiment of the invention is a media processing device including the error rate measurement unit, data write unit, and label print unit; and an information processing device including the error rate evaluation unit and label information acquisition unit; wherein the media processing device and the information processing device are communicatively connected.

This aspect of the invention reduces the load on the media processing device compared with a configuration in which the parts (functions) of the media processing system are embodied in the media processing device alone.

Other objects and attainments together with a fuller understanding of the invention will become apparent and appreciated by referring to the following description and claims taken in conjunction with the accompanying drawings.

BRIEF DESCRIPTION OF THE DRAWINGS

FIGS. 3A-3C show examples of the result printed on the label side during the process shown in the flow chart in FIG. 2.

FIGS. 6A and 6B show examples of the result printed on the label side during the process shown in the flow chart in FIG. 5.

FIGS. 8A and 8B show other examples of the content printed on the label side.

DESCRIPTION OF EMBODIMENTS

Figure 1:
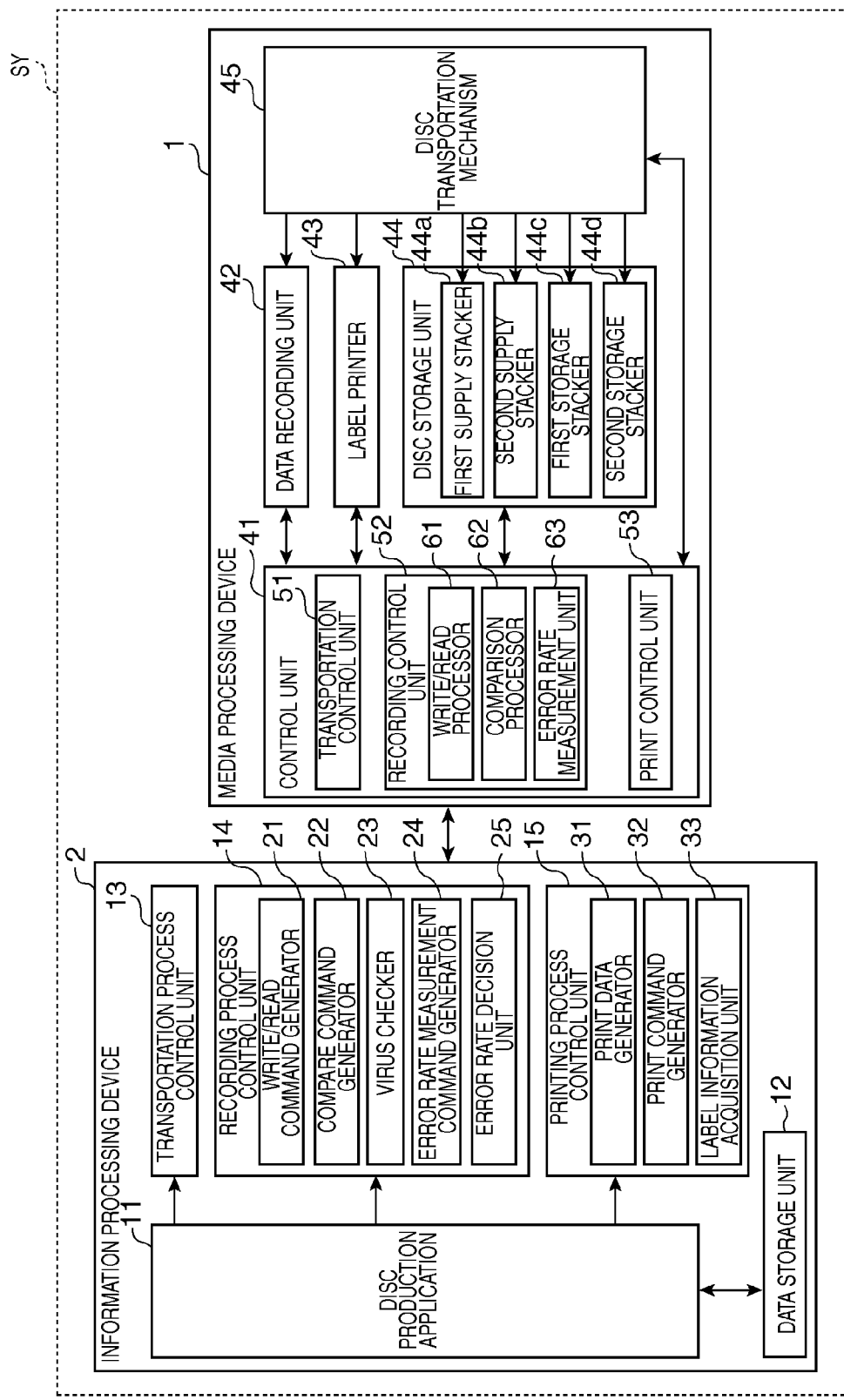
FIG. 1 is a block diagram showing the functional configuration of a media processing system according to the invention.

Preferred embodiments of a media processing system and a method of controlling a media processing system according to the present invention are described below with reference to the accompanying figures. FIG. 1 is a block diagram showing the functional configuration of a media processing system SY according to this embodiment of the invention. As shown in the figure, the media processing system SY includes a media processing device 1, and an information processing device 2 that is connected to the media processing device 1 and controls the media processing device 1. The media processing device 1 writes, reads, and prints on the label side L (see FIGS. 3A-3C) of optical disc media such as a CD (Compact Disc), a DVD (Digital Versatile Disc), and a BD (Blu-ray Disc) (R) media (below simply referred to as discs D (see FIGS. 3A-3C)).

The information processing device 2 can be a common personal computer or server, for example, and primarily includes a disc production application 11, data storage unit 12, transportation process control unit 13, recording process control unit 14, and printing process control unit 15.

The disc production application 11 is an application for selecting the data to write on the recording surface of the disc D or producing (or selecting) a label image (label print data) for printing on the label side L. The disc production application 11 also schedules the process for producing a disc D (disc production process) and a process (disc inspection process, described in detail below) for inspecting the condition of a disc D to which data has been recorded ("recorded media" below), and controls operation of other parts of the media processing device 1 (described below) by instructing the transportation process control unit 13, recording process control unit 14, and printing process control unit 15 to execute processes. Note that the disc production application 11 is executed by the CPU (not shown in the figure) of the information processing device 2.

This disc inspection process is a process that reinspects a disc D that was previously produced by the disc production process of this embodiment (or another device) (that is, discs D to which writing data and printing on the label side L has been completed).

The data storage unit 12 stores data to be written to the recording surface of the disc D, label images (such as stock images provided as sample labels, or label images created with the disc production application 11) for printing on the label side L of the disc D, and error information printed on the label side L. The data storage unit 12 is also used as a recording area for temporarily storing data read from the disc D. The data storage unit 12 also stores disc information (described below in detail) including the disc D error rate and identification information identifying the disc. Note that the error information is text information created in advance by the system developer, and includes information related to errors that can occur during the disc D production process or the disc inspection process.

The transportation process control unit 13 generates and sends to the media processing device 1 a disc transportation command controlling the disc transportation mechanism 45 of the media processing device 1 according to the schedule produced by the disc production application 11.

The recording process control unit 14 generates and outputs commands related to writing and reading data on a disc D and inspecting a disc D in the media processing device 1 according to the schedule produced by the disc production application 11, and includes a write/read command generator 21, compare command generator 22, virus checker 23, error rate measurement command generator 24, and error rate decision unit 25.

The write/read command generator 21 sends a command (a write command) including data specified by the data storage unit 12 or data already recorded on a disc D for writing to an unused disc D to the media processing device 1. Note that included in this write data may be information (file information) describing a list or a directory of files to be recorded, and information (label information) for a label image to be printed on the label side L. The write/read command generator 21 also sends a command (read command) for reading data recorded on the disc D to the media processing device 1.

The compare command generator 22 sends a command (comparison process command) to the media processing device 1 for executing a comparison process that checks whether or not data was written normally to the disc D.

The virus checker 23 performs a virus check on the data written to the disc D.

The error rate measurement command generator 24 sends a command (error rate measurement command) for measuring the disc D error rate to the media processing device 1.

The error rate decision unit 25 compares a predetermined error rate threshold with the error rate measured by the media processing device 1 (the maximum error rate), and determines if the measured error rate is less than or equal to or exceeds the threshold value.

The printing process control unit 15 generates and outputs commands related to the printing process on the label side L of the media processing device 1 according to the schedule determined by the disc production application 11, and includes a print data generator 31, print command generator 32, and label information acquisition unit 33. The label information acquisition unit 33 gets the label information from a disc D on which data was recorded.

The print data generator 31 generates print data for printing on the label side L. When the disc production process succeeds (when an error does not occur in the comparison process, virus check, or error rate evaluation process during disc production), the print data generator 31 generates the print data to be printed on the label side L of the disc D (print data in a format that can be processed by the label printer 43 described below) based on the label image created (or selected) by the user and information related to the error rate measured by the media processing device 1 (the "error rate information" below).

When the disc inspection process (virus check and error rate evaluation process) that inspects the condition of a disc D to which data was previously recorded passes the disc D, the print data generator 31 generates print data for printing (adding) to the label side L of the disc D based on the error rate information resulting from the inspection. If an error occurs during the disc production process (during the comparison process, virus check, or error rate evaluation process), the print data generator 31 generates print data based on error information describing the error content (error information stored in the data storage unit 12).

If an error occurs during the disc inspection process, the label information (information printed on the label side L that describes the content of the disc D) of the disc D that produced an error is acquired by the label information acquisition unit 33, and print data is created based on the acquired label information. Note that this print data is used to print the label side L of the target disc D created in the disc duplication process described below.

The print command generator 32 sends the print data generated by the print data generator 31 and a command (print command) for printing to the media processing device 1.

The media processing device 1 includes a control unit 41, data recording unit 42, label printer 43, disc storage unit 44, and disc transportation mechanism 45.

The data recording unit 42 is a disc drive that writes data to the recording surface of the disc D, and reads data from the recording surface of the disc D. The label printer 43 is a printer that executes a printing process on the label side L of the disc D. Note that the label printer 43 in this embodiment of the invention has an inkjet head and prints the label side L using an inkjet method, but the label printer can be any type of printer.

The disc storage unit 44 stores the discs D and has a cylindrical storage case that can store several tens of discs D in a stack. This embodiment of the invention has two supply stackers (first supply stacker 44a and second supply stacker 44b) that store unused discs D or discs D with previously recorded data, a first storage stacker 44c that stores the discs D for which the disc production process or disc inspection process was completed normally ("good discs"), and a second storage stacker 44d that stores discs D that experience an error during the disc production process or disc inspection process ("error discs"). Note that this stacker configuration is described for example only, and can be changed as needed.

The disc transportation mechanism 45 is a mechanism that carries discs D between the data recording unit 42, label printer 43, and disc storage unit 44, includes an arm (not shown) that holds and moves the disc D horizontally (on the x-axis), a guide (not shown) that moves the arm vertically (on the y-axis), and a drive unit (not shown) that can slide axially along the guide and rotates on the axis of the guide, and transports the disc D to different parts of the media processing device 1 by driving the drive unit.

The control unit 41 controls other parts of the media processing device 1 based on commands from the information processing device 2, and includes a transportation control unit 51, recording control unit 52, and print control unit 53. The control unit 41 can be a CPU.

The transportation control unit 51 controls operation of the disc transportation mechanism 45 based on disc transportation commands from the information processing device 2 (transportation process control unit 13). The print control unit 53 controls operation of the label printer 43 according to print commands from the information processing device 2 (printing process control unit 15).

The recording control unit 52 controls operation of the data recording unit 42 according to commands from the information processing device 2 (recording process control unit 14), and has a write/read processor 61, comparison processor 62, and error rate measurement unit 63.

The write/read processor 61 controls the process of writing data to the disc D based on a write command sent from the information processing device 2, and controls the process of reading data recorded on the disc D based on a read command sent from the information processing device 2.

The comparison processor 62 determines if the data was written normally to the disc D by comparing data written to the disc D with the original data stored in the information processing device 2 (actual data) based on a comparison command sent from the information processing device 2.

The error rate measurement unit 63 measures the error rate of the disc D after writing data is completed based on an error rate measurement command sent from the information processing device 2, and sends the result to the information processing device 2. Note that a data write unit is primarily composed of the recording control unit (write/read processor 61) and data recording unit 42.

Figure 2:
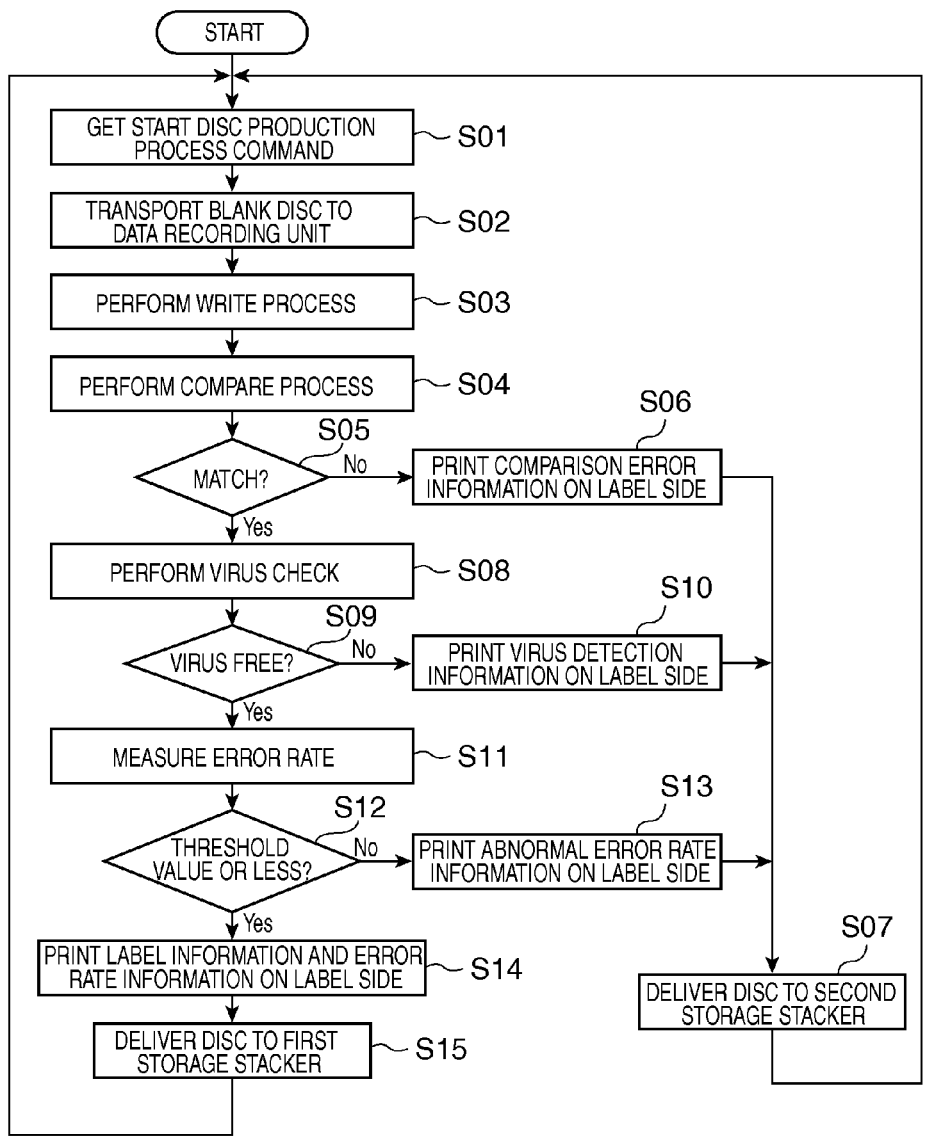
FIG. 2 is a flow chart of steps in the disc production process.
Figure 4:
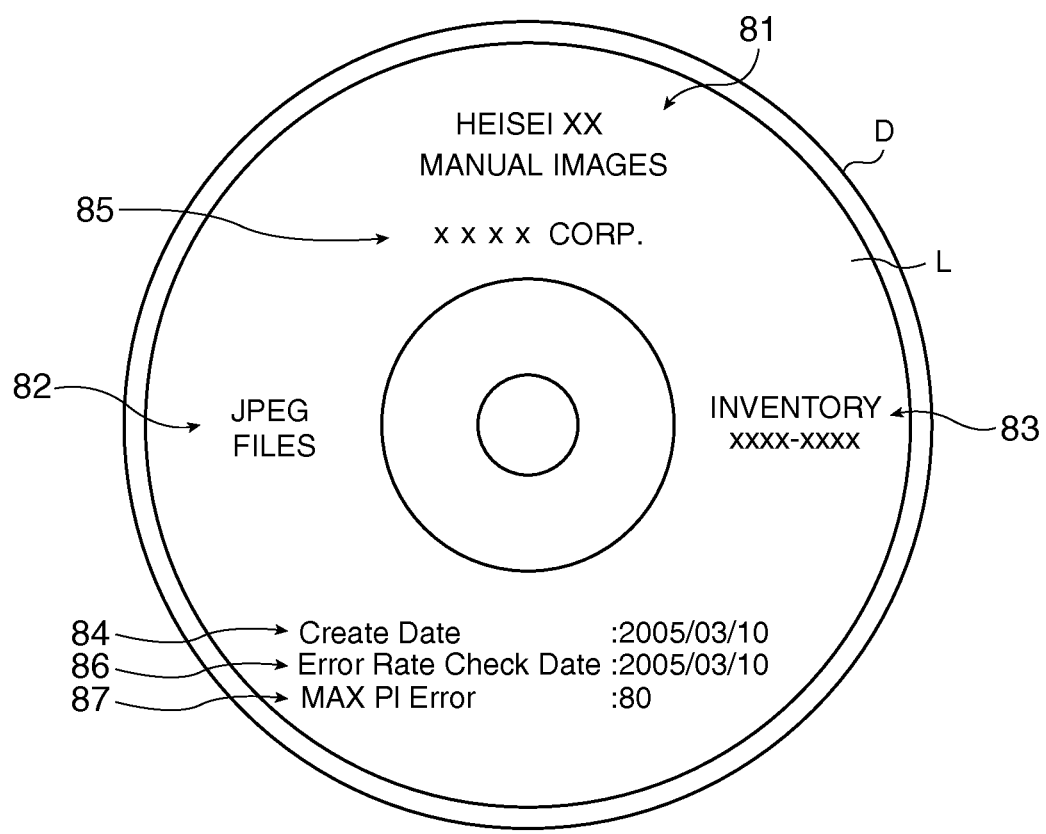
FIG. 4 shows an example of the result printed on the label side during the process shown in the flow chart in FIG. 2.

The disc production process of the media processing system SY is described next with reference to FIG. 2 to FIG. 4. FIG. 2 is a flow chart showing steps in the disc production process. FIGS. 3A-3B and FIG. 4 show the result of printing on the label side L during the process shown in the flow chart in FIG. 2. Note that the data and label image recorded on the disc D are selected in this example. The threshold value for determining the error rate is also preset.

Note that for brevity blank discs D to which data is written are stored in the second supply stacker 44b in the process shown in this flow chart. The invention is not so limited, however, and the same disc production process can be executed with blank discs D loaded in the first supply stacker 44a, or blank discs D loaded in both supply stackers 44a and 44b.

When the information processing device 2 receives a disc production process start command by means of a user operation (S01), the information processing device 2 sends a disc transportation command to the media processing device 1, and the media processing device 1 transports an unused disc D (blank disc) stored in the second supply stacker 44b to the data recording unit 42 based on this command (S02).

The information processing device 2 then sends a write command (including the data to be written) to the media processing device 1, and the media processing device 1 controls the data recording unit 42 based on this command to write data on the disc D (S03).

After the write process ends, the information processing device 2 sends a comparison command to the media processing device 1 and the media processing device 1 performs the comparison process according to this command (S04).

If the data written to the disc D and the original data (the data stored in the information processing device 2) do not match in the comparison process, that is, comparison fails (S05 returns No), the information processing device 2 sends print data indicating a comparison failure to the media processing device 1, and the media processing device 1 controls the label printer 43 to print on the label side L based on the received print data (S06). In this case, therefore, error information indicating that the comparison process failed (comparison error information 71) is printed on the label side L as shown in FIG. 3A. Based on a disc transportation command sent from the information processing device 2, the media processing device 1 then carries the disc D to the second storage stacker 44*d*, the error disc storage location (S07). Using the data written in S03, the disc D production process then repeats (repeat disc production process) (S01). The media processing device 1 thus performs the process to write the data written in S03 again on another unused disc. In this case (and in the repeat disc production processes described below) another disc D is automatically produced in S01 without receiving (acquiring) a disc production process start command from the user again.

If the data written to the disc D and the original data (the data stored in the information processing device 2) match in the comparison process, that is, comparison succeeds (S05 returns Yes), the information processing device 2 performs a virus check on the disc D (S08).

If a virus is detected in this virus check (S09 returns No), the information processing device 2 sends print data describing the virus detection result to the media processing device 1, and the media processing device 1 controls the label printer 43 to print on the label side L based on the received print data (S10). In this case, therefore, error information indicating that a virus was detected (virus detection information 72) is printed on the label side L as shown in FIG. 3B. Based on a disc transportation command sent from the information processing device 2, the media processing device 1 then carries the disc D to the second storage stacker 44*d*, the error disc storage location (S07). Using the data written in S03, the disc D production process then repeats (repeat disc production process) (S01). Note that information such as the name of the file in which a virus was detected could also be printed in FIG. 3B. In addition, instead of using the data that was written in S03, a write command including the data in which a virus was not detected could be re-sent from the information processing device 2 to repeat the disc production process.

If a virus was not detected in the virus check (S09 returns Yes), the information processing device 2 sends an error rate measurement command to the media processing device 1, and based on this command the media processing device 1 measures the error rate of the disc D (S11). The result is sent to the information processing device 2. When the result of the error rate measurement is received from the media processing device 1, the information processing device 2 then determines if the error rate (maximum error rate) is less than or equal to the threshold value.

If the error rate exceeds the threshold value (S12 returns No), the information processing device 2 sends print data describing the error rate abnormality to the media processing device 1, and the media processing device 1 controls the label printer 43 to print on the label side L based on the received print data (S13). In this case, therefore, error information indicating an abnormal error rate (that the maximum error rate exceeds the threshold) (abnormal error rate information 73) is printed on the label side L as shown in FIG. 3C. Based on a disc transportation command sent from the information processing device 2, the media processing device 1 then carries the disc D to the second storage stacker 44*d*, the error disc storage location (S07). Using the data written in S03, the disc D production process then repeats (repeat disc production process) (S01).

If the error rate is below the threshold (S12 returns Yes), the information processing device 2 generates print data merging the error rate information based on the measured error rate received from the media processing device 1 with the label image created (or selected) by the user, sends the print data to the media processing device 1, and the media processing device 1 controls the label printer 43 to print on the label side L based on the received print data (S14). More specifically, as shown in FIG. 4, error rate information (the error rate check date 86 and maximum error rate 87 (such as the maximum error rate of a DVD) in the figure) is printed on the label side L in addition to the label image (the title 81, type of stored data 82, an inventory control number 83, creation date 84, and author 85 (name of producer) in the figure).

The information processing device 2 could also store disc information relating the detected error rate to identification information for the disc D from which the error rate was detected in the data storage unit 12. Note that this identification information is information for identifying a disc D, and is information of the same content (label information) as printed on the label side L in step S14 above (that is, the content denoted by reference numerals 81 to 85). This disc information enables easy determination of the error rate of the produced discs D and makes disc management easier when managing large numbers of discs D.

Based on a disc transportation command sent from the information processing device 2, the media processing device 1 then carries the disc D to the first storage stacker 44*c*, the location for storing good discs (S15). The media processing device 1 then performs the production process for the next disc D (disc production process using the data to be written next) (S01).

Note that the production process (repeat disc production process) is performed only a specific number of times (such as 3 or 5 times) for a disc for which the comparison process, virus check, or error rate evaluation failed as described above, and if the number of times the disc is produced reaches this limit, the repeat disc production process stops and operation goes to the next disc production process, that is, a disc production process to produce discs using the data to be written next.

Figure 5:
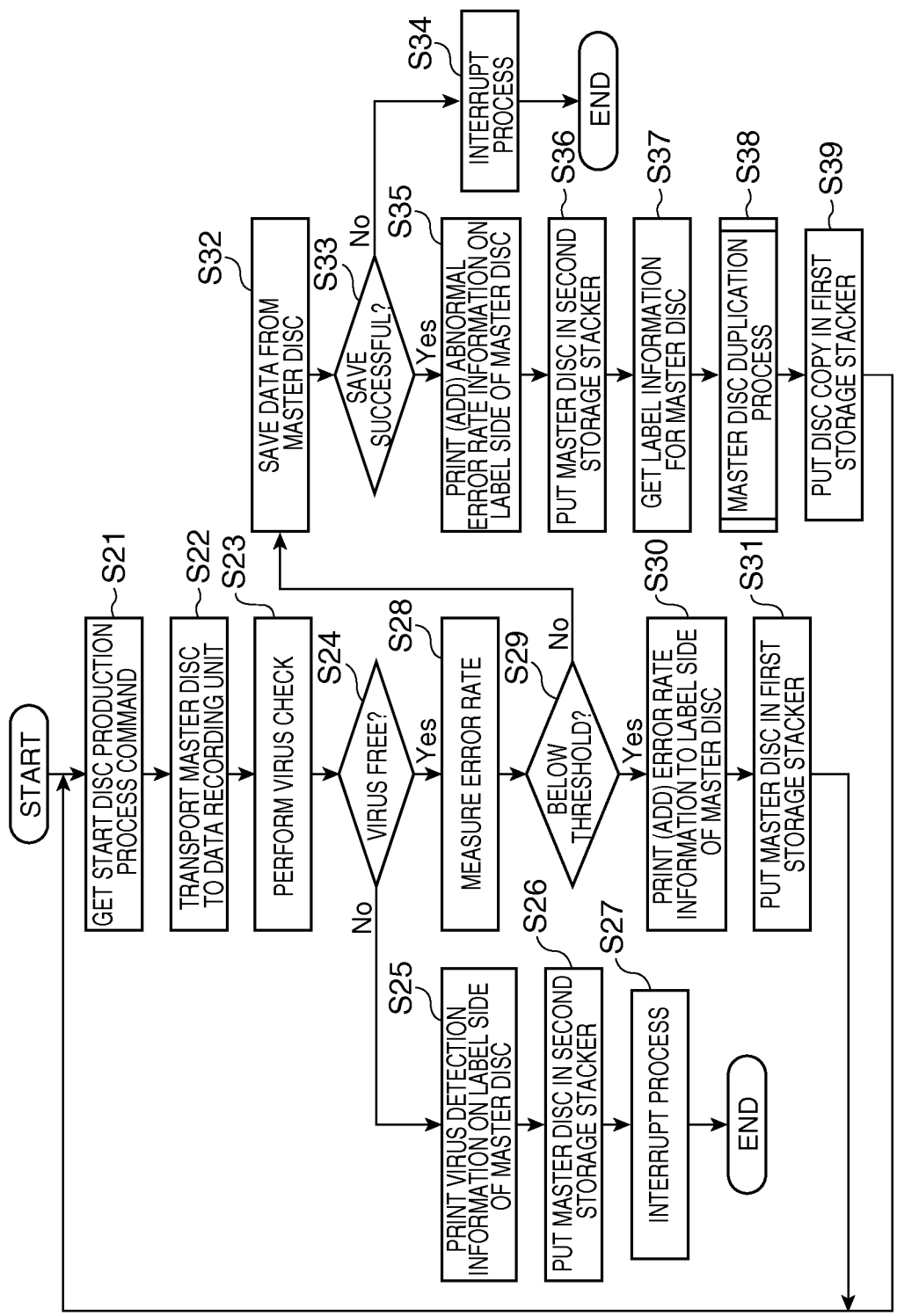
FIG. 5 is a flow chart of steps in the disc inspection process and disc duplication process.
Figure 7:
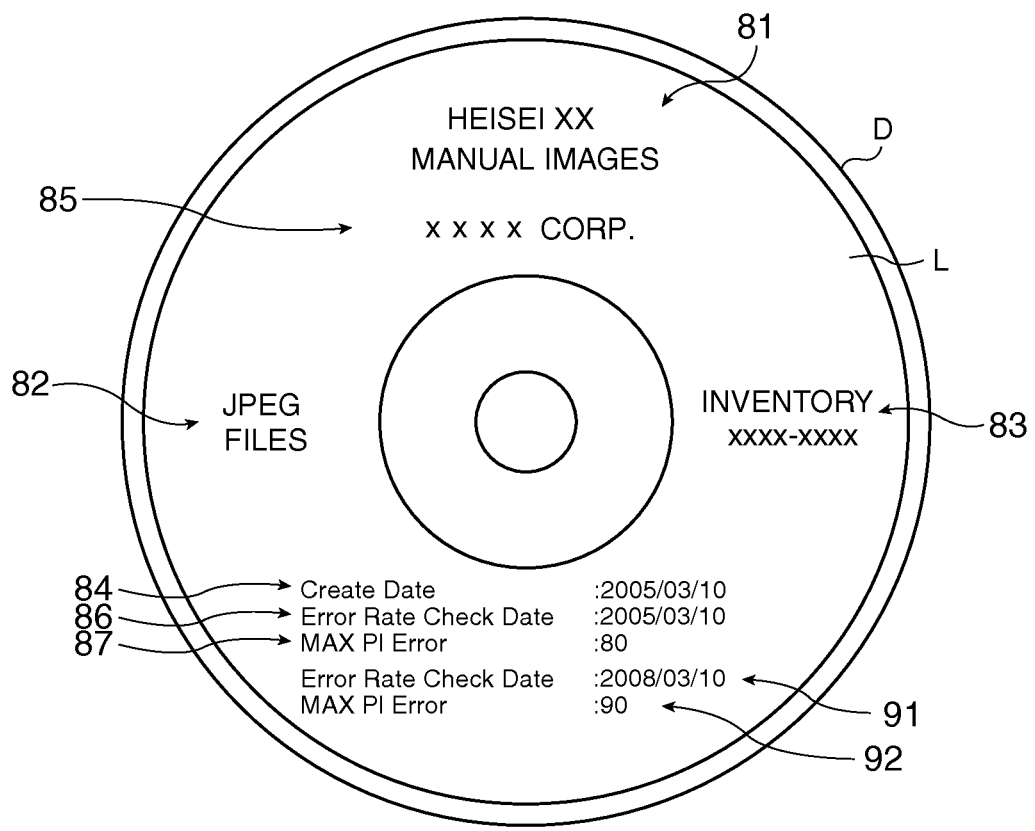
FIG. 7 shows an example of the result printed on the label side during the process shown in the flow chart in FIG. 2.

The disc inspection process and related disc duplication process of the media processing system SY are described next with reference to FIG. 5 to FIG. 7. FIG. 5 is a flow chart of the steps in the disc inspection process and disc duplication process. FIGS. 6A-6B and FIG. 7 show examples of the result of printing on the label side L during the process shown in the flow chart in FIG. 5. As described above, the disc inspection process is a process that re-inspects discs D (recorded media) to which data has already been recorded and a label printed a specific time after the media was produced (such as three years after the disc D was produced).

Note that one or more discs D produced in the disc production process in FIG. 2 (discs with the information shown in FIG. 4 printed on the label side L) are used as the discs D to be inspected (referred to below as "master discs"). In addition, the master discs are loaded in the first supply stacker 44*a*, and unused discs D (blank discs) are loaded in the second supply stacker 44*b* in this example. The threshold value of the error rate is also preset.

When the information processing device 2 receives a command to start the disc inspection process by means of a user operation (S21), the information processing device 2 sends a disc transportation command to the media processing device 1, and the media processing device 1 transports a master disc stored in the first supply stacker 44a to the data recording unit 42 based on this command (S22).

The information processing device 2 then performs a virus check on the master disc (S23).

If a virus is detected in this virus check (S24 returns No), the information processing device 2 sends print data describing the virus detection result to the media processing device 1, and the media processing device 1 controls the label printer 43 to print on the label side L of the master disc based on the received print data (S25). In this case, therefore, error information indicating that a virus was detected (virus detection information 72) is printed on the label side L as shown in FIG. 6A.

Based on a disc transportation command sent from the information processing device 2, the media processing device 1 then carries the master disc to the second storage stacker 44d, the error disc storage location (S26), and ends the inspection process (S27). More specifically, because the data recorded on the master disc is infected with a virus (because the data on the master disc cannot be used), operation waits for the user. Note that the name of the infected file may be printed in FIG. 6A.

If a virus was not detected in the virus check (S24 returns Yes), the information processing device 2 sends an error rate measurement command to the media processing device 1, and based on this command, the media processing device 1 measures the error rate of the master disc (S28, error rate measurement step). The result is sent to the information processing device 2. When the result of the error rate measurement is received from the media processing device 1, the information processing device 2 then determines if the error rate (maximum error rate) is less than or equal to the threshold value (error rate evaluation step).

If the error rate is below the threshold (S29 returns Yes), the information processing device 2 generates print data for the error rate information based on the result of the error rate measurement received from the media processing device 1, and sends the print data to the media processing device 1. The media processing device 1 then controls the label printer 43 to print on the label side L of the master disc based on the received print data (S30).

More specifically, as shown in FIG. 7, error rate information from this disc inspection process (the error rate check date 91 and the maximum error rate 92 during the disc inspection process) is added (printed) to the label image (the title 81, type of stored data 82, an inventory control number 83, creation date 84, and author 85 (name of producer)) and the error rate information (the error rate check date 86 and maximum error rate 87) when the master disc was produced is printed.

Based on a disc transportation command sent from the information processing device 2, the media processing device 1 then moves the master disc to the first storage stacker 44c where good discs are stored (S31), and then starts the disc inspection process using the next master disc (S21).

However, if the error rate exceeds the threshold (S29 returns No), the information processing device 2 sends a master disc read command to the media processing device 1, and stores (saves) the data read from the master disc in response to this command in the data storage unit 12 (S32). If storing this data is not successful, that is, if the data from the master disc could not be completely read (S33 returns No), the media processing device 1 and information processing device 2 stop the process (S34). More specifically, because the data recorded on the master disc cannot be used (the same as when data is lost), operation waits for the user.

If storing this data is successful, that is, if the data from the master disc was completely read (S33 returns Yes), the information processing device 2 sends print data indicating an abnormal error rate to the media processing device 1. The media processing device 1 then controls the label printer 43 and prints on the label side L of the master disc based on the received print data (S35). More specifically, error information indicating an abnormal error rate (that the maximum error rate exceeds the threshold) (abnormal error rate information 73) is printed on the label side L as shown in FIG. 6B. Based on a disc transportation command sent from the information processing device 2, the media processing device 1 then carries the disc D to the second storage stacker 44d, the error disc storage location (S36).

The information processing device 2 then gets the label information from the master disc. More specifically, label information is acquired from the master disc data stored in S32 (S37). A process that duplicates (copies) the master disc (disc duplication process) is then performed (S38, data write step).

The disc duplication process is identical to steps S01 to S14 of the disc production process shown in FIG. 2 and described above. In this case, however, the master disc data stored to the data storage unit 12 in step S32 of this process is written to an unused disc D (blank disc). The print data printed on the label side L of the unused disc D is the print data (more specifically print data merging the label information acquired in S37 and the error rate information measured in S28) generated from the label information acquired in step S37 instead of the label information (see S14 in FIG. 2) created (or selected) by the user. Further aspects of the duplication process are identical, and further description thereof is thus omitted.

If the master disc is copied successfully in the disc duplication process of S37 (the process ends through S14 in FIG. 2), the media processing device 1 moves the disc D (the copy of the master disc) to the first storage stacker 44c where good discs are stored (S39) based on the disc transportation command sent from the information processing device 2, and then performs the inspection process on the next master disc (S21).

The process ends (S27 and S34) if there is a problem with the master disc in this process. Alternatively, the inspection process could be started for the next master disc after reporting to the user that the process was interrupted (such as by displaying a message on the display (not shown in the figure) of the information processing device 2). In other words, the process could return to S21 from S27 and S34.

As described above, by measuring the error rate of a disc D to which data has already been written (recorded media, equivalent to the master disc in FIG. 7), this embodiment of the invention can evaluate the quality (degree of deterioration) of the disc D. In addition, if the error rate exceeds the threshold value, that is, if the disc D has deteriorated, a duplicate (copy) of the original disc D can be created by writing the data from that disc D to an unused disc. As a result, when long-term data storage is necessary, data loss due to deterioration of the stored disc D can be prevented, and a new disc D (copy of the disc D) with quality suitable for long-term data storage can be easily produced. More particularly, when regularly inspecting (verifying) the condition of a large number of discs D is required, the work required for the inspection process can be reduced, saving labor.

The discs D (master discs) inspected in the disc inspection process described above are discs D that were produced in the disc production process as an example, but the invention is not so limited. For example, discs D produced by another device (such as a personal computer or system other than the media processing system SY described above) can also be inspected in the disc inspection process.

The error rate check date 86, 91 and maximum error rate 87, 92 (see FIG. 4 and FIG. 7) are printed on the label side L as the error rate information in the disc production process and the disc inspection process in this embodiment of the invention, but the invention is not so limited. For example, as shown in FIG. 8A and FIG. 8B, the error rate could be printed as a graph G. Further alternatively, the average error rate or total number of errors could be printed with or without the error rate threshold value as the error rate information.

The positions where information (label image, error rate information, error information) are printed on the label side L are shown for example only in this embodiment, and the invention is not so limited. More particularly, if error rate information is added (printed) on the label side L in the disc inspection process (S30 in FIG. 5), the added information may overlap information that was already printed on the label side L. To avoid this, a camera (not shown in the figure) could be disposed in the media processing device 1 so that blank space (space where information is not printed) on the label side L detected, and the error rate information can be printed in the detected position. Alternatively, to enable reading even if the added information overlaps existing information, the added error rate information could be printed using a different color than the information already printed on the label side L.

The information included in the label image (see reference numerals 81 to 85 in FIGS. 6A, 6B, 7, 8A, and 8B) is also shown for example only, and the invention is not so limited. These attributes can be changed appropriately based on the disc production specifications.

This embodiment separately conveys and stores good discs and error discs in a first storage stacker 44c and second storage stacker 44d, respectively, in the disc production process and disc inspection process, but the invention is not so limited. For example, a configuration that has only one storage stacker and stores both good discs and error discs in the same stacker is also conceivable.

This embodiment applies comparison, virus check, and error rate measurement processes (virus check and error rate measurement in the disc inspection process) sequentially to the discs D, but this sequence is for example only and can be changed as desired.

This embodiment also stores disc information in the data storage unit 12 of the information processing device 2, but the invention is not so limited. For example, the disc information could be stored in an external device (not shown in the figure) connected to the information processing device 2.

In the disc duplication process, this embodiment gets label information from data on the source disc D being copied (the master disc), and uses this label information to produce the print data printed on the label side L of the duplicate disc D, but the invention is not so limited. For example, a label for the disc D volume could be stored in addition to the result of the error rate measurement and the identification information (label information) as the disc information stored in the data storage unit 12 during the disc production process (or as disc information stored in the external device), identification information (label information) related to the label of the source disc D volume (master disc) acquired from the disc information, and this data could be used to generate print data.

Figure 9:
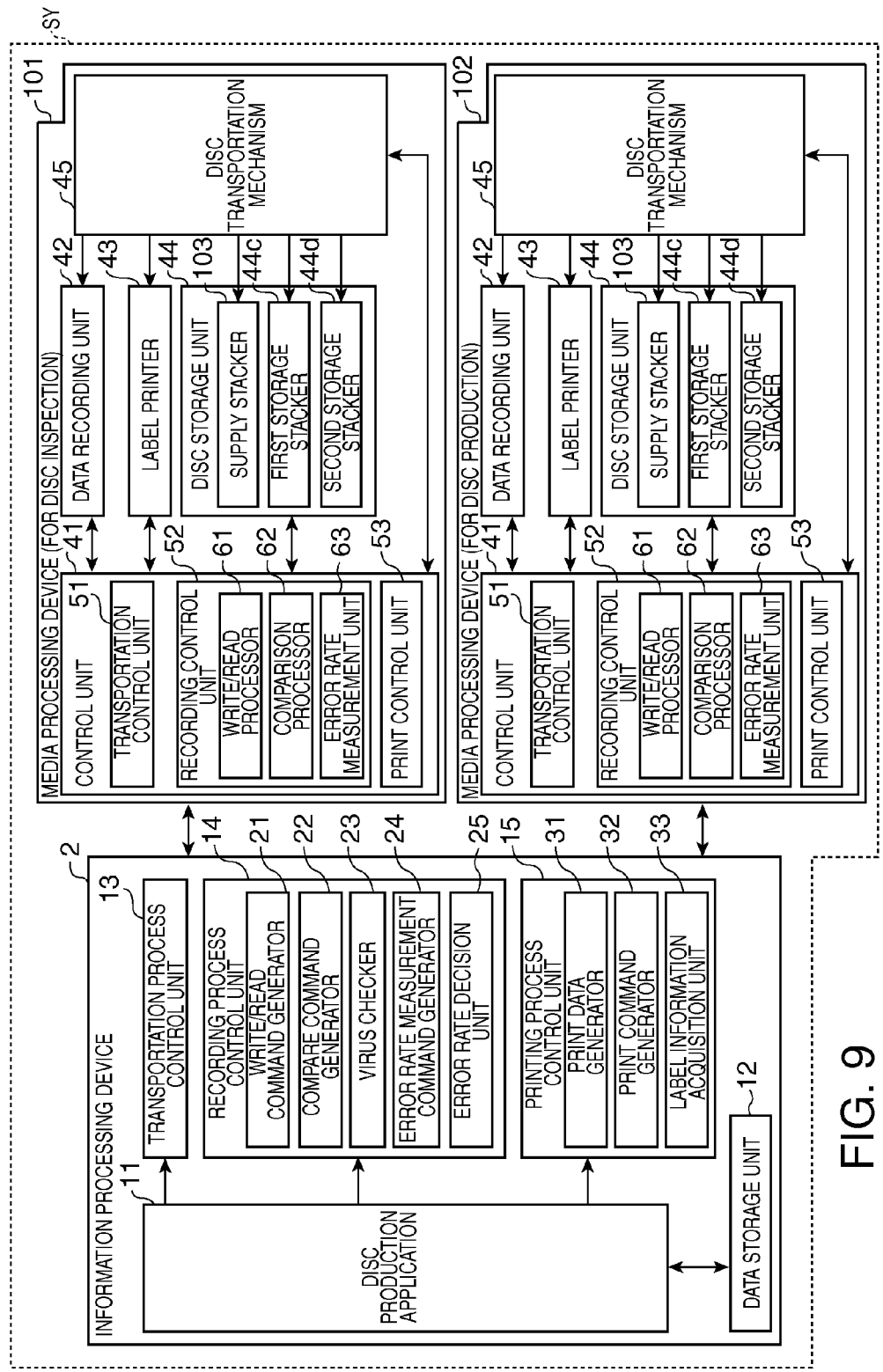
FIG. 9 is a block diagram showing the functional configuration of another example of a media processing system according to the invention.

A media processing system SY according to a variation of the foregoing embodiment could have two media processing devices 101 and 102 connected to the information processing device 2 as shown in FIG. 9. The basic configuration of these two media processing devices 101 and 102 is the same as the media processing device 1 shown in FIG. 1 except that both media processing devices 101 and 102 have only one supply stacker 103 each. In this case, the one media processing device 101 is used for the disc inspection process, the other media processing device 102 is used for the disc production process, and the information processing device 2 sends commands appropriately to the media processing devices 101 and 102.

More specifically, the master discs are loaded in the supply stacker 103 of media processing device 101, unused discs D (blank discs) are loaded in the supply stacker 103 of media processing device 102, and based on process control by the information processing device 2, media processing device 101 performs the process of S21 to S36 in FIG. 5 (the disc inspection process), and media processing device 102 performs the process of steps S37 and S38 in FIG. 5 (disc duplication process). By using two media processing devices, the disc D inspection process and the disc D duplication process (production process) can run simultaneously, and processing time can be shortened. Note that good discs and error discs could also be stored in the same storage stacker in this embodiment.

The media processing system SY of the invention can also be rendered by the media processing device 1 alone.

Components of the media processing system SY (and variations) described above can also be rendered as a program. This program can also be provided stored on a suitable storage medium (not shown in the figure). The storage medium could be, for example, a CD-ROM, flash ROM, memory card (CompactFlash (R), smart media, or memory stick, for example), Compact Disc, magneto-optical disc, DVD, or floppy disk.

The invention is not limited to the foregoing embodiment and variations, and the configuration and steps of the media processing system SY can be changed in many ways without departing from the scope of the accompanying claims.

What is claimed is:

1. A media processing system comprising:
    an error rate measurement unit that measures an error rate of recorded media after specific data is written;
    an error rate evaluation unit that determines whether the error rate measured by the error rate measurement unit is less than or equal to a specific threshold value;
    a data recording unit that, when the error rate evaluation unit determines that the error rate exceeds the specific threshold value, writes the specific data to other media;
    a label print unit that prints on the label side of the media; and
    a label information acquisition unit that acquires label information, which is information printed on the label side of the recorded media;
    wherein when the error rate evaluation unit determines the error rate exceeds the specific threshold value, the label print unit prints based on the label information on the label side of the other media:
    wherein when the error rate evaluation unit determines the error rate is less than or equal to the specific threshold value the label print unit prints error rate information related to the measured error rate on the label side of the recorded media.

2. The media processing system described in claim 1, wherein:
    when the error rate evaluation unit determines the error rate exceeds the specific threshold value, the label print unit prints information indicating the same on the label side of the recorded media.

3. The media processing system described claim 1, wherein:
   at least one of the maximum error rate and a graph showing the error rate is included in the error rate information.

4. The media processing system described claim 1, comprising:
   a media processing device including the error rate measurement unit, data write unit, and label print unit; and
   an information processing device including the error rate evaluation unit and label information acquisition unit;
   with the media processing device and the information processing device being communicatively connected.

5. A control method for a media processing system, comprising:
   measuring an error rate of recorded media to which specific data is written;
   determining if the error rate measured by the error rate measurement step is less than or equal to a specific threshold value;
   when the error rate evaluation step determines the error rate exceeds the specific threshold value, writing the specific data recorded to the recorded media to other media;
   printing on the label side of the media; and
   acquiring label information, which is information printed on the label side or the recorded media;
   wherein when it is determined that the error rate exceeds the specific threshold value, printing is performed based on the label information on the label side of the other media;
   wherein when it is determined that the error rate is less than or equal to the specific threshold value, error rate information related to the measured error rate is printed on the label side of the recorded media.

6. The control method for a media processing system described in claim 5, wherein:
   when it is determined that the error rate exceeds the specific threshold value, information indicating that the error rate exceeds the specific threshold is printed on the label side of the recorded media.

7. A media processing device comprising:
   an error rate measurement unit that measures an error rate of recorded media after specific data is written;
   an error rate evaluation unit that determines if the media error rate measured by the error rate measurement unit is less than or equal to a preset threshold value;
   a data recording unit that, when the error rate evaluation unit determines the error rate exceeds the specific threshold value, writes the specific data recorded to the recorded media to other media;
   a label print unit that prints on the label side of the media; and
   a label information acquisition unit that acquires label information which is information printed on the label side of the recorded media;
   wherein when the error rate evaluation unit determines the error rate exceeds the specific threshold value the label print unit prints based on the label information on the label side of the other media;
   when the error rate evaluation unit determines the error rate is less than or equal to the specific threshold value, the label print unit prints error rate information related to the measured error rate on the label side of the recorded media.

8. The media processing device described in claim 7, wherein:
   when the error rate evaluation unit determines the error rate exceeds the specific threshold value, the label print unit prints information indicating the same on the label side of the recorded media.

9. A media processing system comprising:
   a processor that measures an error rate of recorded media after specific data is written;
   a processor that determines whether the error rate measured is less than or equal to a specific threshold value;
   a disc drive that, when the processor determines that the error rate exceeds the specific threshold value, writes the specific data to other media;
   a printer that prints on the labels side of the media; and
   a processor that acquires label information, which is information printed on the label side of the recorded media;
   wherein when the processor determines the error rate exceeds the specific threshold value, the printer prints based on the label information on the label side of the other media;
   wherein when the processor determines the error rate is less than or equal to the specific threshold value, the printer prints error rate information related to the measured error rate on the label side of the recorded media.

10. A media processing device comprising:
    a processor that measures an error rate of recorded media after specific data is written;
    a processor that determines if the media error rate measured is less than or equal to a preset threshold value;
    a disc drive that, when the processor determines the error rate exceeds the specific threshold value, writes the specific data recorded to the recorded media to other media;
    a printer that prints on the label side of the media; and
    a processor that acquires label information, which is information printed on the label side of the recorded media;
    wherein when the processor determines the error rate exceeds the specific threshold value, the printer prints based on the label information on the label side of the other media;
    wherein when the processor determines the error rate is less than or equal to the specific threshold value, the printer prints error rate information related to the measured error rate on the label side of the recorded media.

* * * * *